United States Patent
Choi et al.

(10) Patent No.: US 11,983,134 B2
(45) Date of Patent: May 14, 2024

(54) METHOD FOR RECOGNIZING ANOTHER ELECTRONIC DEVICE BY USING PLURALITY OF INTERFACES, AND ELECTRONIC DEVICE THEREFOR

(71) Applicant: LG ELECTRONICS INC., Seoul (KR)

(72) Inventors: Hyoung Kyu Choi, Seoul (KR); Jin Kyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 95 days.

(21) Appl. No.: 17/754,528

(22) PCT Filed: Oct. 10, 2019

(86) PCT No.: PCT/KR2019/013285
§ 371 (c)(1),
(2) Date: Apr. 5, 2022

(87) PCT Pub. No.: WO2021/070986
PCT Pub. Date: Apr. 15, 2021

(65) Prior Publication Data
US 2023/0315666 A1     Oct. 5, 2023

(51) Int. Cl.
*G06F 13/40*     (2006.01)
*G06F 9/44*      (2018.01)
*G06F 9/4401*    (2018.01)

(52) U.S. Cl.
CPC ........ *G06F 13/4068* (2013.01); *G06F 9/4411* (2013.01)

(58) Field of Classification Search
CPC ............................ G06F 13/4068; G06F 9/4411
See application file for complete search history.

(56) References Cited

U.S. PATENT DOCUMENTS

2015/0228246 A1*  8/2015  Kim ................. H04N 21/41422
                                                     345/520
2015/0317227 A1* 11/2015  Jiang ................... G06F 9/4411
                                                     713/2

(Continued)

FOREIGN PATENT DOCUMENTS

JP       2019070906      5/2019
KR    1019990006749      1/1999

(Continued)

OTHER PUBLICATIONS

PCT International Application No. PCT/KR2019/013285, International Search Report dated Jul. 6, 2020, 3 pages.

*Primary Examiner* — Henry Tsai
*Assistant Examiner* — Harry Z Wang
(74) *Attorney, Agent, or Firm* — LEE, HONG, DEGERMAN, KANG & WAIMEY

(57) ABSTRACT

Disclosed is an electronic device including a first interface configured to receive information about a device information storage device configured to store information about another electronic device, a second interface configured to communicate with a processor of the other electronic device, and at least one processor, wherein the at least one processor is configured to, when the device information storage device is identified through the first interface, acquire the information about the other electronic device from the device information storage device through the first interface, when the device information storage device is not identified through the first interface, check whether the other electronic device is identified through the second interface, and when the other electronic device is identified through the second interface, acquire the information about the other electronic device through the second interface based on communication with the processor of the other electronic device.

14 Claims, 10 Drawing Sheets

(56) References Cited

U.S. PATENT DOCUMENTS

| | | | | |
|---|---|---|---|---|
| 2019/0227944 A1* | 7/2019 | Petkov | ................. | G06F 3/0665 |
| 2019/0317591 A1* | 10/2019 | Sanghi | ................. | G06F 9/4403 |
| 2019/0361828 A1* | 11/2019 | Tsai | ........................ | H05K 1/14 |
| 2020/0042710 A1* | 2/2020 | Liu | ....................... | G06F 21/575 |

FOREIGN PATENT DOCUMENTS

| | | |
|---|---|---|
| KR | 1020120074020 | 7/2012 |
| KR | 101490409 | 2/2015 |
| KR | 1020180083572 | 7/2018 |

* cited by examiner

[Fig. 1]
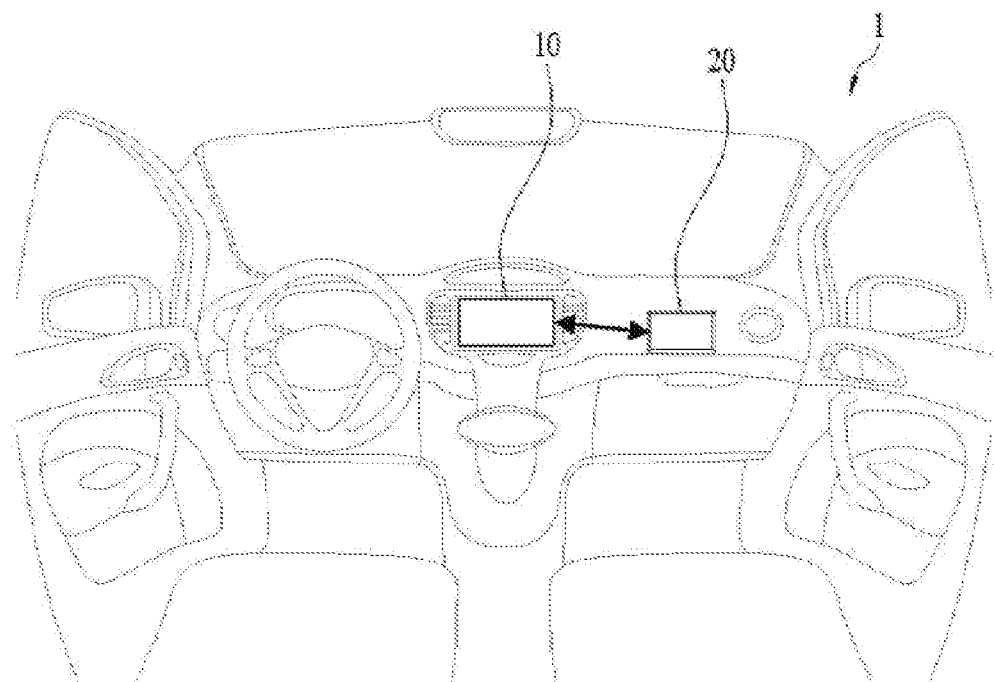

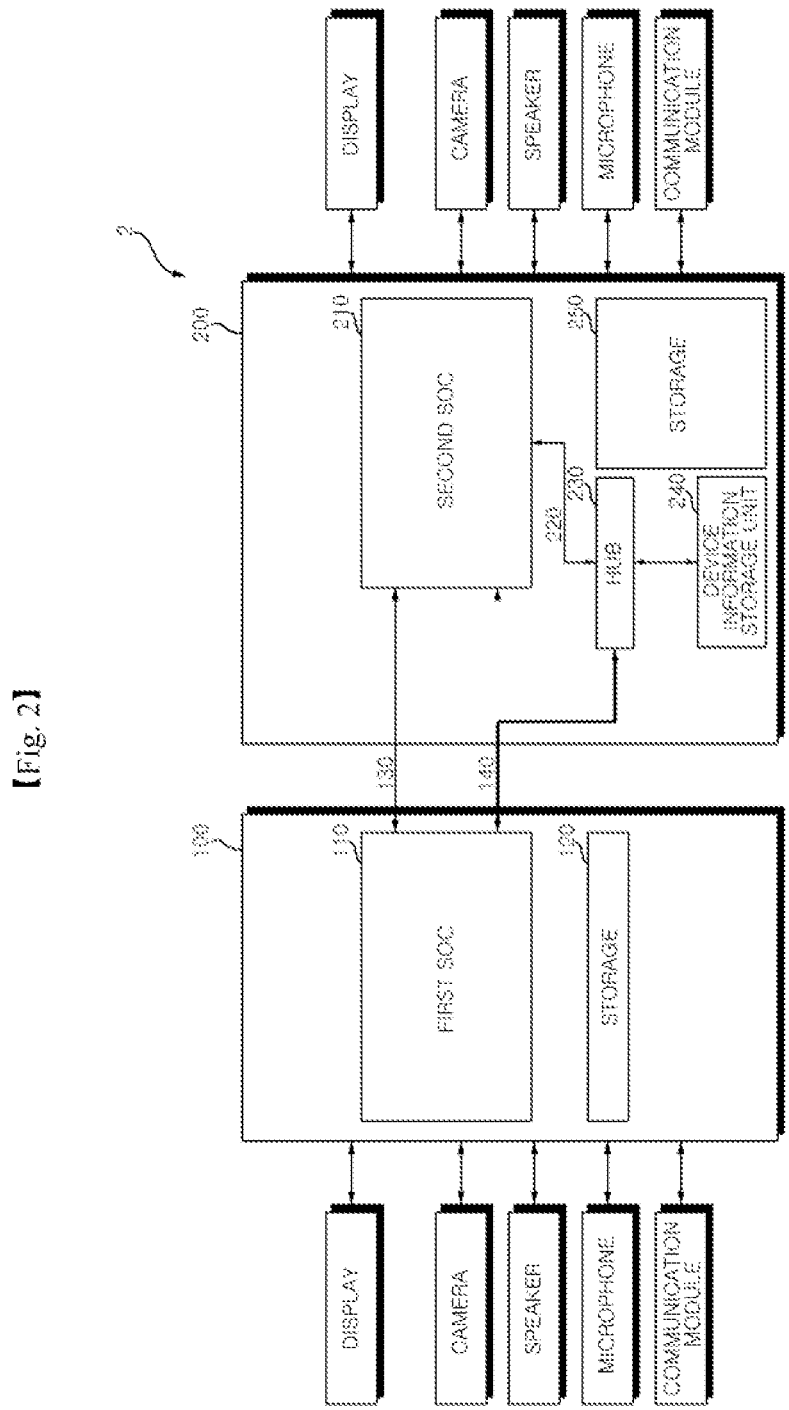
[Fig. 2]

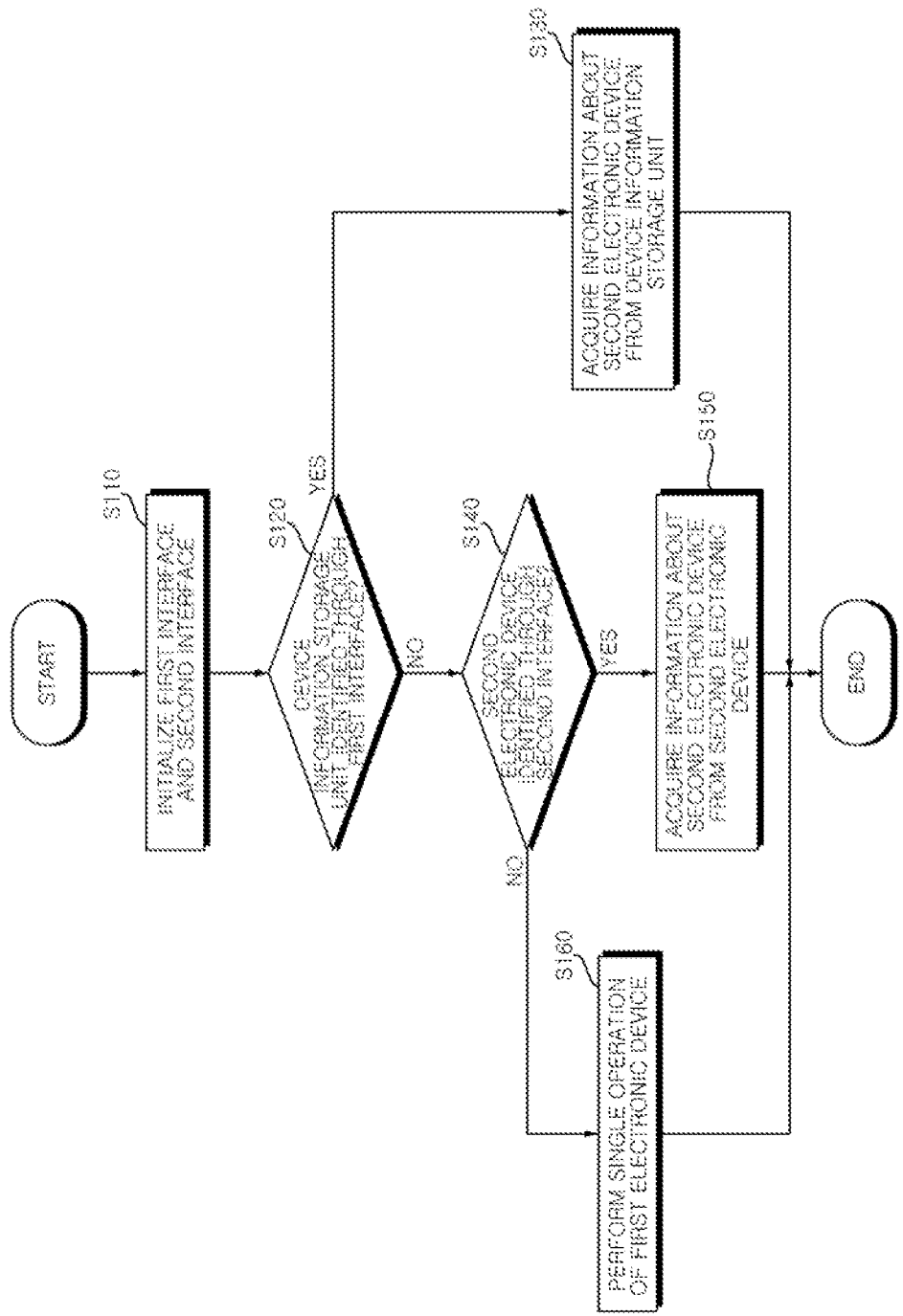
[Fig. 3]

[Fig. 4]
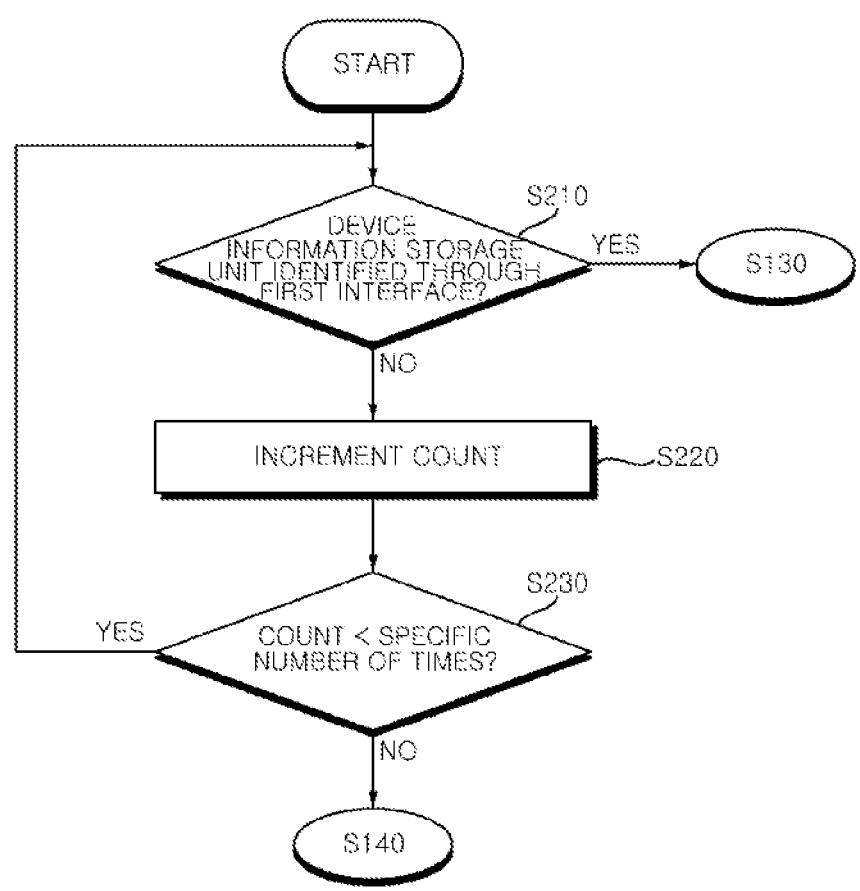

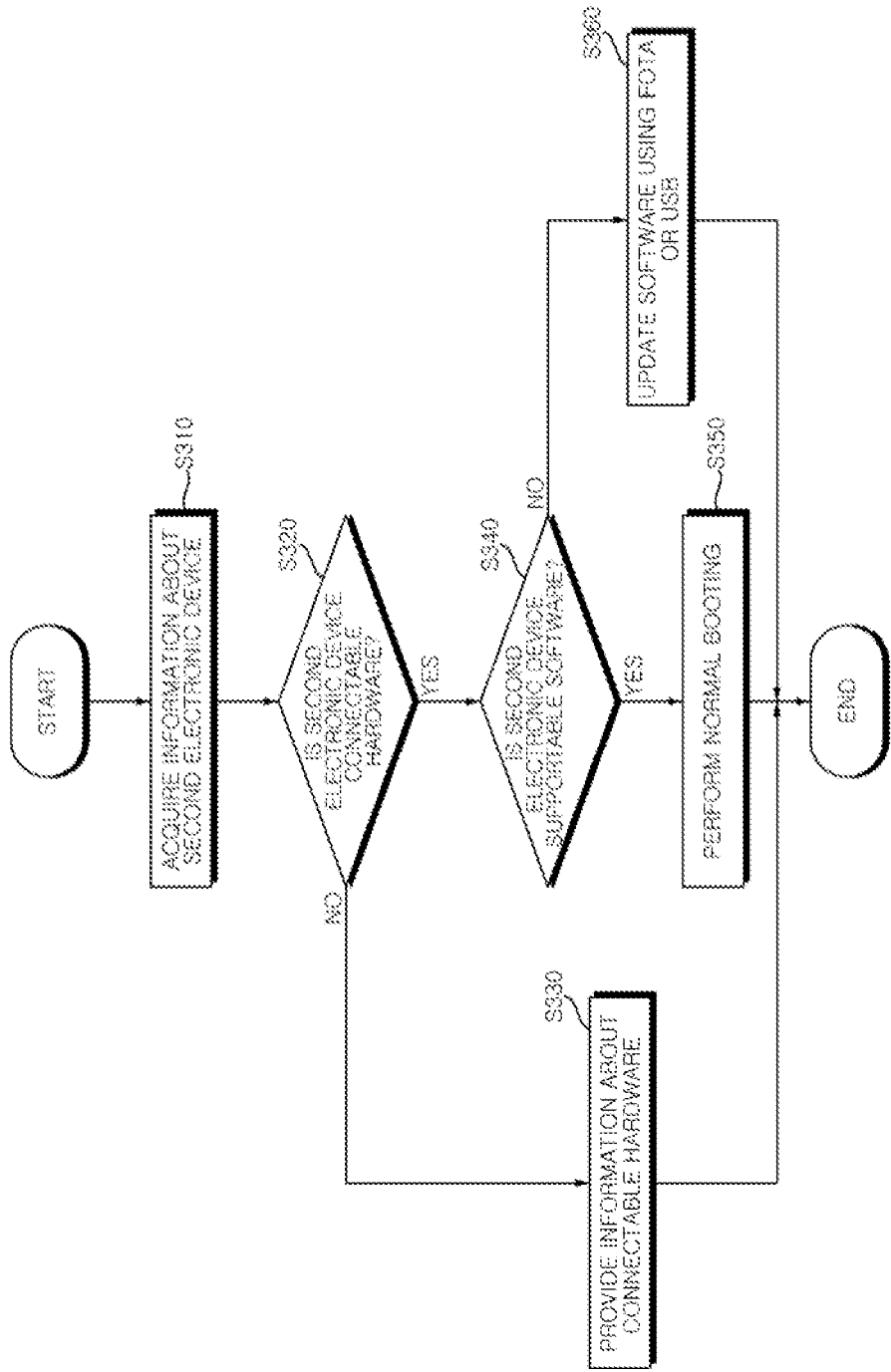

[Fig. 6]
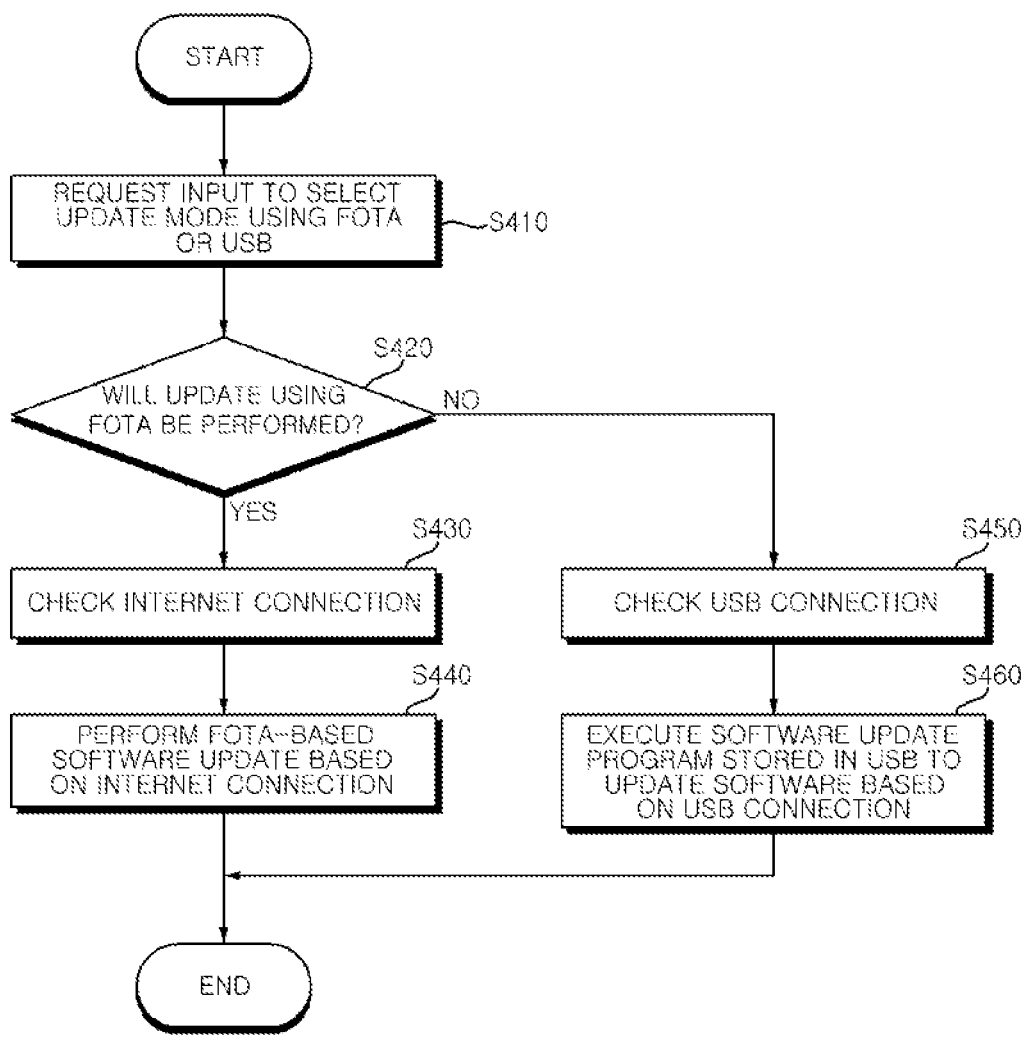

[Fig. 7]
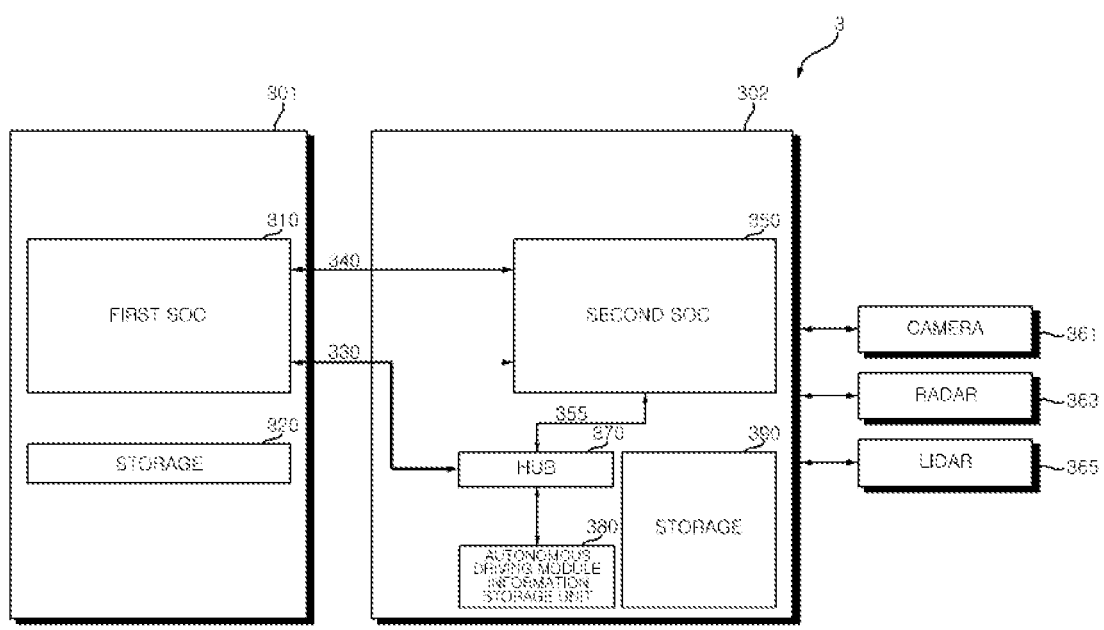

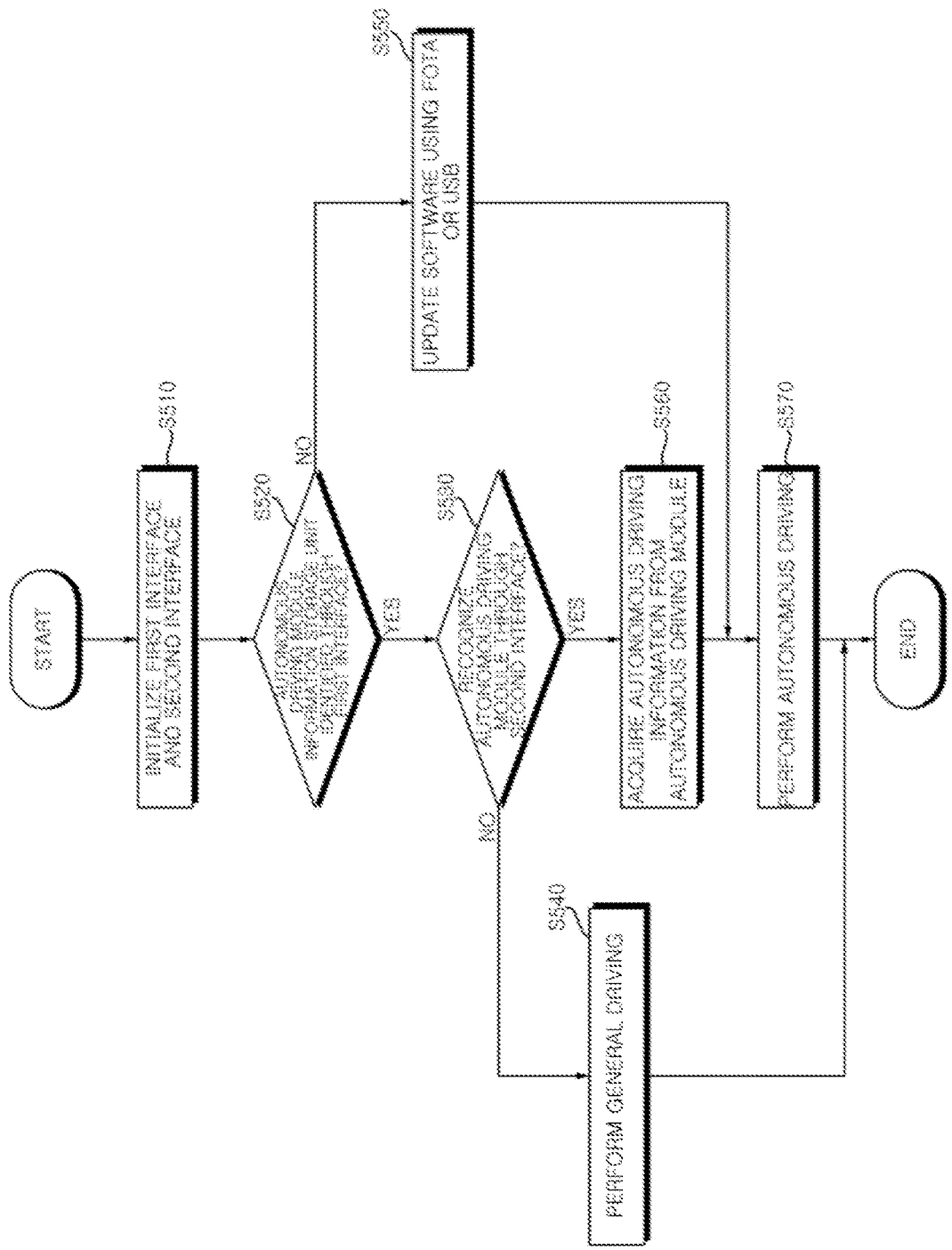

[Fig. 9]
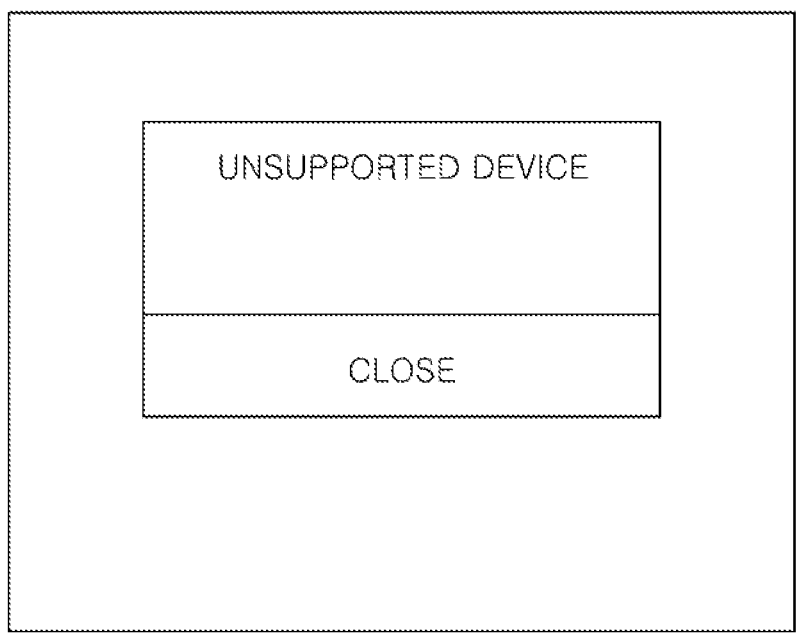

[Fig. 10]
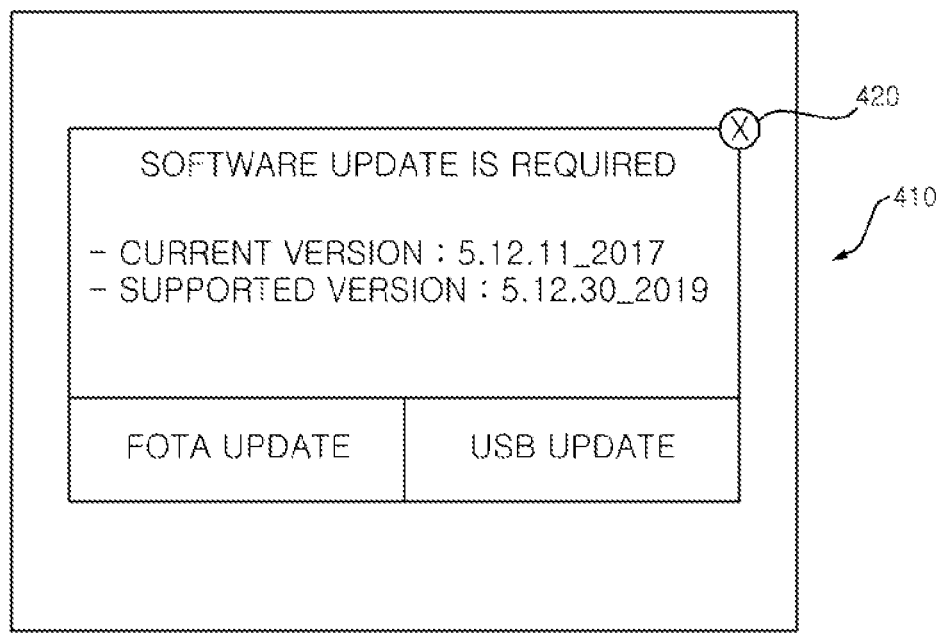

METHOD FOR RECOGNIZING ANOTHER ELECTRONIC DEVICE BY USING PLURALITY OF INTERFACES, AND ELECTRONIC DEVICE THEREFOR

CROSS-REFERENCE TO RELATED APPLICATIONS

This application is the National Stage filing under 35 U.S.C. 371 of International Application No. PCT/KR2019/013285, filed on Oct. 10, 2019, the contents of which is hereby incorporated by reference herein in its entirety.

TECHNICAL FIELD

The present disclosure relates to a method and electronic device capable of recognizing another electronic device using a plurality of interfaces. More particularly, the present disclosure relates to a method and electronic device capable of recognizing another electronic device using a first interface configured to receive device information of the other electronic device and a second interface configured to communicate with the other electronic device.

BACKGROUND ART

With rapid development of electronic technology, various kinds of electronic devices have been popularized in everyday life, and attempts to use various electronic devices together in order to supplement functions thereof have been increasingly made.

In this aspect, interest has increased in function extension technology of extending functions through connection between devices such that functions provided by a specific device can be used by another device. As an example of function extension technology, a mobile terminal may be connected to a television such that functions provided by the mobile terminal can be used through the television.

Function extension may be achieved based on compatibility between a plurality of electronic devices connected to each other. That is, function extension may be achieved only when electronic devices capable of providing function extension are connected to each other. Consequently, it is necessary for an electronic device to check whether another electronic device is an electronic device capable of providing function extension.

Conventionally, identification of an electronic device is performed after booting of the electronic device is completed. As a result, time is taken to some extent until a function of another electronic device is substantially available as the result of function extension from the booting start time of the electronic device. Therefore, a method capable of more rapidly identifying another electronic device connected to an electronic device is required.

DISCLOSURE

Technical Problem

It is an object of the present disclosure to acquire device information of another electronic device using a first interface at the time of booting of an electronic device, whereby it is possible to more rapidly identify the other electronic device connected to the electronic device.

It is another object of the present disclosure to, when the device information is not acquired through the first interface, communicate with a processor of the other electronic device through a second interface to identify the other electronic device, whereby it is possible to more accurately and effectively identify the other electronic device connected to the electronic device.

Objects of the present disclosure are not limited to the aforementioned objects, and other unmentioned objects will be clearly understood by those skilled in the art based on the following description.

Technical Solution

An electronic device according to an embodiment of the present disclosure includes a first interface configured to receive information about a device information storage device configured to store information about another electronic device, a second interface configured to communicate with a processor of the other electronic device, and at least one processor, wherein the at least one processor is configured to, when the device information storage device is identified through the first interface, acquire the information about the other electronic device from the device information storage device through the first interface, when the device information storage device is not identified through the first interface, check whether the other electronic device is identified through the second interface, and when the other electronic device is identified through the second interface, acquire the information about the other electronic device through the second interface based on communication with the processor of the other electronic device.

A control method of an electronic device according to an embodiment of the present disclosure includes, when a device information storage device configured to store information about another electronic device is identified through a first interface configured to receive information about the device information storage device, acquiring the information about the other electronic device from the device information storage device through the first interface, when the device information storage device is not identified through the first interface, checking whether the other electronic device is identified through a second interface configured to communicate with a processor of the other electronic device, and when the other electronic device is identified through the second interface, acquiring the information about the other electronic device through the second interface based on communication with the processor of the other electronic device.

An electronic device according to an embodiment of the present disclosure includes a device information storage device configured to store information about the electronic device, at least one processor, a first interface configured to transmit information about the device information storage device to another electronic device when the other electronic device is connected to the device information storage device, and a second interface configured to communication with the other electronic device, wherein, when connection with the other electronic device through the first interface is not identified, the at least one processor transmits the information about the electronic device to the other electronic device based on communication with the other electronic device through the second interface.

A system according to an embodiment of the present disclosure includes a first electronic device, a second electronic device, a first interface configured to transmit information about the second electronic device from a device information storage device to the first electronic device, and a second interface configured to allow a processor of the first electronic device and a processor of the second electronic device to communicate with each other therethrough, wherein the second electronic device includes the device information storage device including the information about the second electronic device, and the first electronic device is configured to, when the device information storage device is identified through the first interface, acquire the information about the second electronic device from the device information storage device through the first interface, when the device information storage device is not identified through the first interface, check whether the second electronic device is identified through the second interface, and when the second electronic device is identified through the second interface, acquire the information about the second electronic device through the second interface based on communication with the processor of the second electronic device.

Advantageous Effects

In an electronic device and method according to embodiments of the present disclosure, device information of another electronic device is acquired using a first interface at the time of booting of the electronic device, whereby it is possible to more rapidly identify the other electronic device connected to the electronic device.

Also, in the electronic device and method according to the embodiments of the present disclosure, when the device information is not acquired through the first interface, the electronic device communicates with a processor of the other electronic device through a second interface to identify the other electronic device, whereby it is possible to more accurately and effectively identify the other electronic device connected to the electronic device.

Effects obtainable from the present disclosure are not limited by the above mentioned effects, and other unmentioned effects can be clearly understood from the following description by those having ordinary skill in the technical field to which the present disclosure pertains.

DESCRIPTION OF DRAWINGS

FIG. 1 shows an example in which a first electronic device and a second electronic device according to an embodiment of the present disclosure are used.

FIG. 2 is a functional block diagram of a first electronic device and a second electronic device according to an embodiment of the present disclosure.

FIG. 3 is a flowchart showing a control method of the first electronic device according to the embodiment of the present disclosure.

FIG. 4 is a flowchart showing in detail some steps of the control method of the first electronic device according to the embodiment of the present disclosure.

FIG. 5 is a flowchart showing in detail some other steps of the control method of the first electronic device according to the embodiment of the present disclosure.

FIG. 6 is a flowchart showing in detail yet some other steps of the control method of the first electronic device according to the embodiment of the present disclosure.

FIG. 7 is a functional block diagram of a first electronic device and a second electronic device according to another embodiment of the present disclosure.

FIG. 8 is a flowchart showing a control method of the first electronic device according to the other embodiment of the present disclosure.

FIG. 9 shows an example of a user interface provided by the first electronic device according to the embodiment of the present disclosure.

FIG. 10 shows another example of the user interface provided by the first electronic device according to the embodiment of the present disclosure.

BEST MODE

Advantages and features of the present disclosure and a method of achieving the same will be more clearly understood from embodiments described below with reference to the accompanying drawings. However, the present disclosure is not limited to the following embodiments and may be implemented in various different forms. The embodiments are provided merely to complete the present disclosure and to fully provide a person having ordinary skill in the art to which the present disclosure pertains with the category of the present disclosure. The present disclosure is defined only by the category of the claims.

In the following description of the present disclosure, a detailed description of known functions and configurations incorporated herein will be omitted unless actually necessary. In addition, terms used in the following description, which are those defined taking into consideration functions realized in accordance with the present disclosure, may vary depending upon the intention of users or operators or upon usual practices. Therefore, the definition of such terms must be made based on the disclosure of this specification.

The present disclosure may be variously modified and may have various embodiments, and specific embodiments will be shown in the drawings and will be described in detail in this specification. However, the present disclosure is not limited to the specific embodiments, and it should be understood that the present disclosure includes all alterations, equivalents, and substitutes that fall within the idea and technical scope of the present disclosure.

It will be understood that, although the terms "first", "second", etc. may be used herein to describe various elements, corresponding elements should not be understood to be limited by these terms, which are used only to distinguish one element from another.

It will be understood that, when a component is referred to as being "connected to" or "coupled to" another component, it may be directly connected to or coupled to the other component, or intervening components may be present.

FIG. 1 shows an example in which a first electronic device and a second electronic device according to an embodiment of the present disclosure are used. Specifically, FIG. 1 shows an example in which a system 2 including a first electronic device 100 and a second electronic device 200 is implemented.

Referring to FIG. 1, the system 2 may be a system for vehicle function extension. Here, the first electronic device 10 may be a device inserted into (or attached to) a vehicle in order to control the vehicle, and the second electronic device 20 may be a separate device detachably attached to the vehicle, the second electronic device being connectable to the first electronic device 10.

Specifically, the first electronic device 10 may be a device mounted in a vehicle in a step of manufacturing the vehicle to provide a driver with various functions related to driving (e.g. temperature control and multimedia reproduction). The second electronic device 20 may be a device capable of being mounted to the vehicle in a state of being connected to the first electronic device 10. The second electronic device 20 may be implemented as a simple module.

The first electronic device 10 may provide a user with functions of the second electronic device 20 based on connection with the second electronic device 20. That is, the functions of the first electronic device 10 may be extended through connection with another external electronic device, such as the second electronic device 20, whereby it is possible to provide the user with various functions.

In FIG. 1, the case in which the present disclosure is applied to a vehicle system 1 is described by way of example. However, the present disclosure is not limited thereto, and the present disclosure is applicable to various systems for which function extension is required.

FIG. 2 is a functional block diagram of a first electronic device and a second electronic device according to an embodiment of the present disclosure. FIG. 2 shows an example of a system 2 including a first electronic device 100 and a second electronic device 200, wherein function extension of the system is possible.

Referring to FIG. 2, the system 2 may include a first electronic device 100, a second electronic device 200, a first interface 140, and a second interface 130.

The first electronic device 100 may include a first system on chip (SoC) 110 and a storage 120. Depending on circumstances, the first electronic device may include at least a portion of the first interface 140 and at least a portion of the second interface 130.

The second electronic device 200 may include a second system on chip (SoC) 210, a hub 230, a device information storage device 240, and a storage 250. Depending on circumstances, the second electronic device may be implemented so as to include at least a portion of the first interface 140 and at least a portion of the second interface 130.

Here, each component included in the first electronic device 100 and the second electronic device 200 may be implemented by a computing device including a microprocessor.

Depending on embodiments, each of the first electronic device 100 and the second electronic device 200 may be connected to at least one input device (e.g. a camera, a speaker, a microphone, or a communication module) or at least one output device (e.g. a display). Depending on circumstances, the first electronic device 100 or the second electronic device 200 may be implemented so as to include an input device or an output device instead of being connected to the input device or an output device; however, the present disclosure is not limited thereto.

The first electronic device 100 may provide a specific function using the second electronic device 200 based on information about the second electronic device 200. The information about the second electronic device 200 may include information about hardware or software of the second electronic device 200.

The first electronic device 100 may determine, based on the information about the second electronic device 200, whether the second electronic device 200 is a connectable device (or an available device), and upon determining that the second electronic device is a connectable device, a function provided by the second electronic device 200 (e.g. a function using an application installed in the second electronic device 200) may be provided through the first electronic device 100.

The first interface 140 may be connected to the second electronic device 200 to transmit and receive device information of the second electronic device 200. Specifically, the first interface 140 may connect the device information storage device 240 and the first SoC 110 to each other such that the information about the second electronic device 200 stored in the device information storage device 240 is transmitted to the first SoC 110.

The second interface 130 may be connected to the second electronic device 200 to perform communication. Specifically, the second interface may connect the first SoC 110 and the second SoC 210 to each other such that communication between the first electronic device 100 and the second electronic device 200 is performed. In addition, the second interface 130 may transmit information from the second SoC 210 to the first SoC 110. Here, the transmitted information may be information acquired by the second SoC 210.

The first interface 140 may be an interface that has a lower data-transfer rate than the second interface 130. That is, the first interface 140 may be a low-speed interface, and the second interface 130 may be a high-speed interface. For example, the first interface 140 may include an inter-integrated circuit (I2C) or a serial peripheral interface (SPI). The second interface 130 may include peripheral component interconnect express (PCIe).

The I2C, which is an interface used for connection with a low-speed peripheral, may be a communication interface constituted by a line for data transmission and reception and a line for timing synchronization. The SPI may be an interface capable of performing full-duplex communication. The PCIe, which is a serial interface for input and output, enables higher-speed communication. The PCIe, configuration of which is more complicated than the I2C or the SPI, may need much more time than the I2C or the SPI for initialization. Meanwhile, I2C, SPI, and PCIe are known to those skilled in the art, and therefore a detailed description thereof will be omitted.

The first SoC 110 of the first electronic device 100 may include at least one processor configured to control driving of the first electronic device 100, and may be referred to as a controller or a processor depending on embodiments.

The first SoC 110 may attempt to acquire the information about the second electronic device 200 from the device information storage device 240 of the second electronic device 200 through the first interface 140 in response to a booting operation. Here, the booting operation may mean a procedure of making preparation such that operation of the first SoC 110 is possible based on application of power to the first SoC 110.

Specifically, the first SoC 110 may initialize the first interface 140 and the second interface 130 in response to starting of booting. Initialization of the first interface 140 and the second interface 130 may be independently performed, and may be performed irrespective of order.

Depending on circumstances, time taken to initialize the first interface 140 may be shorter than time taken to initialize the second interface 130. In this case, initialization of the second interface 130 may be performed in parallel with operations using the first interface 140, a description of which will follow.

When initialization of the first interface 140 is completed, the first SoC 110 may identify the device information storage device 240 of the second electronic device 200 through the first interface 140. The first SoC 110 may identify the device information storage device 240 based on confirmation of connection with the device information storage device 240 through the first interface 140. The operation of identifying the device information storage device 240 may be performed in response to the booting operation.

The first SoC 110 may attempt to communicate with the device information storage device 240 through the first interface 140. When the attempt to perform communication is successful, the first SoC 110 may determine that the device information storage device 240 has been connected, i.e. the device information storage device 240 has been identified.

Depending on circumstances, as shown, the first SoC 110 may be connected to the device information storage device 240 through the first interface 140 and the hub 230 of the second electronic device 200. In this case, the first SoC 110 may communicate with the device information storage device 240 through the hub 230, and may check whether the device information storage device 240 has been connected based thereon.

Meanwhile, the hub 230 may allow another component (e.g. the second SoC 210) to be connected to the device information storage device 240 in addition to the first interface 140. That is, entry into the device information storage device 240 may be possible through one path. One of a plurality of components may be selectively connected to the device information storage device 240 based on connection of the hub 230 to one end of the device information storage device 240.

The device information storage device 240 may store the information about the second electronic device 200, such as information about hardware of the second electronic device 200 and information about software of the second electronic device 200. Here, the information about hardware may include various kinds of information related to hardware, such as type of hardware, version of hardware, manufacturing date of hardware, and performance of hardware. The information about software may include various kinds of information related to software, such as type of software, version of software, manufacturing date of software, and upgrade date of software.

When the device information storage device 240 is identified, the first SoC 110 may acquire the information about the second electronic device 200 from the device information storage device 240 through the first interface 140.

The first SoC 110 may acquire the information about the second electronic device 200 in various manners. For example, when the device information storage device 240 is identified, the first SoC 110 may access the device information storage device 240 to directly acquire the information about the second electronic device 200. As another example, the first SoC 110 may acquire the information about the second electronic device 200 based on reception of the information about the second electronic device 200 through communication with the device information storage device 240.

In an embodiment, the first SoC 110 may attempt to acquire information from the device information storage device 240 a plurality of times. The first SoC 110 may attempt to acquire information from the device information storage device 240 within a predetermined number of times until information acquisition is successful.

The number of attempts to acquire information may be set to an arbitrary value. Depending on circumstances, however, the number of attempts to acquire information may be preset based on the time when the booting operation of the first electronic device 100 is completed. A more detailed description related thereto will be given below with reference to FIG. 4.

Acquisition of the information about the second electronic device 200 through the first interface 140 may be performed in response to the booting operation. That is, an operation related to the first interface 140 may be performed before booting of the first electronic device 100 is completed. Meanwhile, an operation using the second interface 130, a description of which will follow, may be performed after booting of the first electronic device 100 is completed.

When the device information storage device 240 is not identified through the first interface 140, the first SoC 110 may check whether the second electronic device 200 is identified through the second interface 130. Here, the second interface 130 may be connected to the second SoC 210 of the second electronic device 200, and the first SoC 110 may check whether the second electronic device 200 is identified based thereon.

For example, when connection of the device information storage device 240 through the first interface 140 is not checked, the first SoC 110 may determine that the device information storage device 240 is not identified, and may check connection of the second electronic device 200 through the second interface 130. Upon checking that the second electronic device 200 has been connected through the second interface 130, the first SoC 110 may determine that the second electronic device 200 has been identified.

As another example, when the information about the second electronic device 200 through the device information storage device 240 is not acquired through the first interface 140, the first SoC 110 may determine that the device information storage device 240 is not identified, and may check connection of the second electronic device 200 through the second interface 130. When connection of the second electronic device 200 is checked through the second interface 130, the first SoC 110 may determine that the second electronic device 200 has been identified.

Meanwhile, the second interface 130 may include PCIe, as mentioned above. In this case, the first SoC 110 may check whether the second electronic device 200 is connected based on PCIe-based communication. For example, the first SoC 110 may add a heartbeat check signal to a sideband signal in a PCIe channel to perform communication, and may sense a change related thereto to check whether the second electronic device 200 has been connected.

As another example, the first SoC 110 may perform link initialization and enumeration after PCIe communication, and may check whether the second electronic device 200 has been connected based on checking of a bus device function (BDF).

When the second electronic device 200 is identified through the second interface 130, the first SoC 110 may acquire the information about the second electronic device 200 through the second interface 130 based on communication with the second SoC 210 of the second electronic device 200.

Specifically, the first SoC 110 may request the information about the second electronic device 200 from the second SoC 210 through the second interface 130. As will be described below, the second SoC 210 may access the device information storage device 240 to acquire the information about the second electronic device 200 in response to the request. The second SoC 210 may transmit the acquired information to the first SoC 110 through the second interface 130.

Upon acquiring the information about the second electronic device 200, the first SoC 110 may check whether the information about the second electronic device 200 corresponds to at least some of information about an available device stored in the storage 120.

When the information about the second electronic device 200 corresponds to at least some of the information about the available device, the first SoC 110 may determine that a specific function based on the second electronic device 200 is available. When the information about the second electronic device 200 does not correspond to any of the information about the available device, the first SoC 110 may release connection with the second electronic device 200, or may provide information for requesting update of software of the second electronic device 200. A more detailed description related thereto will be given with reference to FIG. 5.

The storage 120 may store various kinds of information related to driving of the first electronic device 100. For example, the storage 120 may store information about an available device, i.e. information about another device connected to the first electronic device 100 such that function extension of the other device is possible.

Specifically, the storage 120 may store information about at least one of hardware and software of the available device. The information about hardware may include various kinds of information related to hardware, such as type of hardware, version of hardware, manufacturing date of hardware, and performance of hardware. The information about software may include various kinds of information related to software, such as type of software, version of software, manufacturing date of software, and upgrade date of software.

The information about the available device may be preset depending on the support specifications of the first electronic device 100 and may be stored in the storage 120.

Upon receiving a signal for requesting the information about the second electronic device 200 through the second interface 130, the second SoC 210 may access the device information storage device 240 to acquire the information about the second electronic device 200. The second SoC 210 may transmit the acquired information about the second electronic device 200 to the first SoC 110 through the second interface 130.

Depending on circumstances, the second SoC 210 may be connected to the device information storage device 240 via the hub 230. Based thereon, the second SoC 210 may acquire the information about the second electronic device 200 from the device information storage device 240.

The hub 230 may connect the device information storage device 240 to a plurality of components. The hub 230 may connect one of the plurality of components to the device information storage device 240 based on switching between the components connected to the device information storage device 240 according to a predesignated setting.

Specifically, one end of the hub 230 may be connected to the device information storage device 240, and the other end of the hub may be connected to the plurality of components to be connected to the device information storage device 240 (e.g. the first SoC 110 and the second SoC 210).

The hub 230 may connect one of the plurality of components to the device information storage device 240 through switching according to a predesignated condition. For example, upon receiving a specific signal from the first interface, the hub 230 may connect the device information storage device 240 to the first SoC 110 through the first interface 140. Upon receiving a specific signal from the second SoC 210, the hub 230 may connect the device information storage device 240 to the second SoC 210 through a path 220.

The device information storage device 240 may store the information about the second electronic device 200. Specifically, the device information storage device 240 may be a component configured to store the information about the second electronic device 200 and implemented such that an external device, such as the first electronic device 100, can access the device information storage device independent of the storage 250.

As described above, therefore, the first SoC 110 may acquire information stored in the device information storage device 240 through the second SoC 210, or may acquire the same not through the second SoC 210.

The device information storage device 240 may store the information about the second electronic device 200, i.e. information about at least one of hardware and software of the second electronic device 200. The device information storage device 240 may be a nonvolatile memory. For example, the device information storage device 240 may include an electrically erasable programmable read-only memory (EEPROM).

Although the EEPROM is a nonvolatile memory, writing may be possible when a specific electrical signal is applied to the EEPROM. When the information about the second electronic device 200 is changed, the second SoC 210 may update the information about the second electronic device 200 stored in the device information storage device 240 based thereon.

The storage 250 may store information required to drive the second electronic device 200. For example, the storage 250 may store information about the operating system (OS) of the second electronic device 200. It may be difficult for another electronic device to directly access the storage 250, which is a general storage. That is, the second electronic device 200 may use the information stored in the storage 250 only through the second SoC 210.

In FIG. 2, the device information storage device 240 and the storage 250 are shown as separate components. Depending on circumstances, however, the device information storage device 240 may be implemented so as to be included in the storage 250 but to be distinguished from information stored in the storage 250 such that another electronic device is allowed to access the device information storage device 240. When booting is started, the first electronic device 100 according to the embodiment of the present disclosure may acquire the information about the second electronic device 200 from the device information storage device 240 through the first interface 140, which is a low-speed interface that can be simply driven, until booting is completed, whereby it is possible to more rapidly identify the second electronic device 200. That is, it is possible to acquire the information about the second electronic device 200 such that the second electronic device 200 can be more rapidly used before the second interface 130, which is a high-speed interface, can be used after booting is completed.

In addition, if the information about the second electronic device 200 is not acquired through the first interface 140, the first electronic device 100 may acquire the information about the second electronic device 200 using the second interface 130, which is a high-speed interface. As a result, it is possible to improve accuracy and reliability in acquiring the information about the second electronic device 200.

FIG. 3 is a flowchart showing a control method of the first electronic device according to the embodiment of the present disclosure. Specifically, FIG. 3 is a flowchart of a control method of the first electronic device 100 of the system 2 shown in FIG. 2. Depending on circumstances, steps of FIG. 3 may be performed in order different from the order shown in the figure. In the following description, content duplicate with FIG. 1 or FIG. 2 will be omitted.

Referring to FIG. 3, the first electronic device 100 may initialize the first interface 140 and the second interface 130 (S110). Initialization of the first interface 140 and initialization of the second interface 130, which are performed in starting steps of the operation of the first interface 140 and the second interface 130, may be independently performed, and may be performed irrespective of order.

The first electronic device 100 may identify the device information storage device 240 through the first interface 140 (S120). Specifically, the second electronic device 200 may check whether the device information storage device 240 of the second electronic device 200 is connected through the first interface 130 in order to identify the device information storage device 240.

For example, when the device information storage device 240 is connected, the first electronic device 100 may determine that the device information storage device 240 is identified. When the device information storage device 240 is not connected, the first electronic device 100 may determine that the device information storage device 240 is not identified.

Whether the device information storage device 240 is connected may be checked through the attempt to communicate with the first electronic device 100 through the first interface 140. For example, the first electronic device 100 may transmit a communication signal to the device information storage device 240 through the first interface 140, and may determine that the device information storage device 240 is connected when a response thereto is checked.

Depending on circumstances, the first interface 140 may be connected to the device information storage device 240 via the hub. The hub, which is a medium for connection between a plurality of devices and the device information storage device 240, may include a switch, and may control a device connected to the device information storage device 240 by controlling the switch. For example, when the hub 230 adjusts the switch to a first position, the first interface 140 and the device information storage device 240 may be connected to each other. The hub 230 may adjust the switch to a second position to connect another path (e.g. the path 220 of FIG. 2) to the device information storage device 240.

Switching conditions of the hub 230 may be predesignated. For example, when the first electronic device 100 transmits a communication signal through the first interface 140, the hub 230 may connect the device information storage device 240 and the first electronic device 100 to each other.

When the device information storage device 240 is identified, the first electronic device 100 may acquire information about the second electronic device 200 from the device information storage device 240 (S130). Specifically, the device information storage device 240 may be identified, and the first electronic device 100 may acquire information about the second electronic device 200 stored in the device information storage device 240. Identification of the device information storage device 240 through the first interface 140 may be performed in response to the booting operation. For example, the first electronic device 100 may identify the device information storage device 240 through the first interface 140 from booting starting time to booting completion time.

When the device information storage device 240 is not identified, the first electronic device 100 may identify the second electronic device 200 through the second interface 130 (S140). Specifically, when the device information storage device 240 cannot be recognized through the first interface 140 or when the information about the second electronic device 200 cannot be acquired, the first electronic device 100 may attempt to identify the second electronic device 200 through the second interface 130.

Identification of the second electronic device 200 may be checking whether the second electronic device 200 is connected to the first electronic device 100 through the second interface 130. The second interface 130 may be connected to a processor (or the second SoC 210) of the second electronic device 200. The first electronic device 100 may identify the second electronic device 200 based thereon.

For example, when the second interface 130 is PCIe, the first electronic device 100 may add a specific signal (e.g. a heartbeat check signal) to a sideband signal in a PCIe channel, may transmit the same to the second electronic device 200, and may check a response thereto to identify the second electronic device 200. That is, upon receiving the response, it may be determined that the second electronic device 200 is identified, and upon receiving no response, it may be determined that the second electronic device 200 is not identified. The sideband signal or the specific signal is known to those skilled in the art, and therefore a detailed description thereof will be omitted.

As another example, when the second interface 130 is PCIe, the first electronic device 100 may perform enumeration and may check the BDF after link initialization to identify the second electronic device 200. Upon checking that the second electronic device 200 is present through checking of the BDF, the first electronic device may determine that the second electronic device 200 is identified. When the second electronic device 200 is not present, the first electronic device may determine that the second electronic device 200 is not identified. Link initialization, enumeration, and checking of the BDF are known to those skilled in the art, and therefore a detailed description thereof will be omitted.

When the second electronic device 200 is identified through the second interface 130, the first electronic device 100 may acquire the information about the second electronic device 200 from the second electronic device 200 (S150). Specifically, when the second electronic device 200 is identified, the first electronic device 100 may transmit an information request signal to the processor (or the second SoC 210) of the second electronic device 200. Upon receiving the information request signal, the processor of the second electronic device 200 may acquire the information about the second electronic device 200 stored in the device information storage device 240 based on connection with the device information storage device 240.

When the second electronic device 200 is not identified through the second interface 130, the first electronic device 100 may perform a single operation of the first electronic device 100 (S160). Specifically, when the second electronic device 200 is not identified through the second interface 130, the first electronic device 100 may determine that there is no other electronic device connected to the first electronic device 100, and may perform a single operation of the first electronic device 100.

Depending on circumstances, the first electronic device 100 may include a display. In this case, when the second electronic device 200 is not identified, the first electronic device 100 may display a notification window to notify that the second electronic device 200 has not been found on the display.

Meanwhile, acquisition of the information about the second electronic device 200 and subsequent detailed operations will be described below with reference to FIG. 5.

FIG. 4 is a flowchart showing in detail some steps of the control method of the first electronic device according to the embodiment of the present disclosure. Specifically, FIG. 4 shows step S120 of FIG. 3 in more detail.

Referring to FIG. 4, the first electronic device 100 may identify the device information storage device 240 through the first interface 140 (S210). Specifically, the first electronic device 100 may check whether the device information storage device 240 is connected to the first electronic device 100 through the first interface 140.

When the device information storage device 240 is connected to the first electronic device 100 through the first interface 140, the first electronic device 100 may perform step S130 of FIG. 3.

If the device information storage device 240 is not connected to the first electronic device 100 through the first interface 140, the first electronic device 100 may increment the count (S220). Here, the count may mean the number of times that the first electronic device 100 attempts to identify the device information storage device 240 through the first interface 140. When the count is incremented by 1, this may mean that an attempt to identify the device information storage device 240 is performed once more.

The first electronic device 100 may check whether the count is less than a specific number of times (S230). Here, the specific number of times may be a value preset based on booting time of the first electronic device 100 and recognition time of the device information storage device 240. For example, when 5 seconds are taken until booting of the first electronic device 100 is completed and when 1 second is taken until the first electronic device 100 recognizes the device information storage device 240, the specific number of times may be set to a specific value (e.g. 3 times or 5 times) equal to or less than the maximum number of times that recognition is performed until booting is completed. However, this is merely an example, and the present disclosure is not limited thereto. For example, the specific number of times may be set to an arbitrary value.

When the count is less than the specific number of times, the first electronic device 100 may identify again the device information storage device 240 through the first interface 140 (S210), and an operation of incrementing the count, a description of which will follow, may be performed.

FIG. 5 is a flowchart showing in detail some other steps of the control method of the first electronic device according to the embodiment of the present disclosure. Specifically, FIG. 5 shows the control method of the first electronic device 100 performed after step S130 or step S150 of FIG. 3 in more detail.

Referring to FIG. 5, the first electronic device 100 may acquire the information about the second electronic device 200 (S310). Specifically, the first electronic device 100 may be connected to the device information storage device 240 through the first interface 140 to acquire the information about the second electronic device 200 in relation to step S130, or may acquire the information about the second electronic device 200 based on a request for information from the second electronic device 200 through the second interface 130 in relation to step S150.

The first electronic device 100 may check whether the second electronic device 200 is connectable hardware (S320). The first electronic device 100 may check whether the second electronic device 200 is constituted by hardware connected to the first electronic device 100 so as to provide a specific function based on the acquired information about the second electronic device 200.

Specifically, the first electronic device 100 may check whether there is information corresponding to the information about the second electronic device 200, among information about the available device stored in the storage of the first electronic device 100.

For example, the information about the available device may include information about hardware or software for a device connectable to or compatible with the first electronic device 100. As another example, the information about the available device may include information about hardware or software for at least one device configured such that, when the first electronic device 100 is connected to another device, a function provided by the other device is provided by the first electronic device 100.

The first electronic device 100 may compare information about the available device with the information about hardware, among the information about the second electronic device 200, to check whether the second electronic device 200 includes hardware connectable to the first electronic device 100. Here, the connectable hardware may mean hardware connected to the first electronic device 100 and manufactured such that extension of a specific function is possible.

When there is information corresponding to the information about hardware of the second electronic device 200, among the information about the available device, the first electronic device 100 may determine that the second electronic device 200 has connectable hardware. For example, when the information about the available device includes information about first hardware, second hardware, first software, and second software and the information about the second electronic device 200 includes information about first hardware, the first electronic device 100 may determine that the second electronic device 200 has connectable hardware.

When there is no information corresponding to the information about hardware of the second electronic device 200, among the information about the available device, the first electronic device 100 may determine that the second electronic device 200 has no connectable hardware. For example, when the information about the available device includes information about first hardware, second hardware, first software, and second software and the information about the second electronic device 200 includes information about third hardware, the first electronic device 100 may determine that the second electronic device 200 has no connectable hardware.

When the second electronic device 200 has no connectable hardware, the first electronic device 100 may provide information about connectable hardware (S330). The information about connectable hardware may be provided in various manners. For example, the first electronic device 100 may provide the information about connectable hardware through the output device of the first electronic device 100. As another example, the first electronic device 100 may provide the information about connectable hardware to the second electronic device 200 such that the information about connectable hardware is provided through the second electronic device 200.

Depending on circumstances, the first electronic device 100 may provide a notification indicating that connection is impossible, instead of the information about connectable hardware. A more detailed example related thereto will be given with reference to FIG. 9.

When the second electronic device 200 has connectable hardware, the first electronic device 100 may check whether the second electronic device 200 has supportable software (S340). Step S340 may also be performed using a method corresponding to step S320.

That is, the first electronic device 100 may check whether the second electronic device 200 has supportable software based on comparison between the information about the available device stored in the storage and the information about software, among the information about the second electronic device 200. Here, the supportable software may mean software compatible with hardware or software of the first electronic device 100 such that extension of a specific function is provided on the first electronic device 100.

Specifically, when there is information corresponding to information about software of the second electronic device 200, among the information about the available device, the first electronic device 100 may determine that the second electronic device 200 has supportable software. When there is no information corresponding to information about software of the second electronic device 200, among the information about the available device, the first electronic device 100 may determine that the second electronic device 200 has no supportable software.

When the second electronic device 200 has supportable software, the first electronic device 100 may perform normal booting (S350). For example, when the second electronic device 200 has supportable software, the first electronic device 100 may supply power to hardware of the first electronic device 100 used for a specific function related to the second electronic device 200 such that booting is normally performed.

When the second electronic device 200 has no supportable software, the first electronic device 100 may update software using firmware over the air (FOTA) or universal serial bus (USB) (S360). A more detailed description related thereto will be described below with reference to FIG. 6.

Depending on circumstances, when the second electronic device 200 has no connectable software, the first electronic device 100 may provide information indicating that it is necessary to update software. For example, the first electronic device 100 may output the information indicating that it is necessary to update software through the output device of the first electronic device 100. As another example, the first electronic device 100 may provide information indicating that it is necessary to update software through the second electronic device 200 based on transmission of the information indicating that it is necessary to update software to the second electronic device 200. An example of this information will be described with reference to FIG. 10.

FIG. 6 is a flowchart showing in detail yet some other steps of the control method of the first electronic device according to the embodiment of the present disclosure. Specifically, FIG. 6 shows step S360 of FIG. 5 in more detail.

Referring to FIG. 6, the first electronic device 100 may request an input to set an update (or upgrade) mode using the FOTA or the USB (S410). Specifically, upon determining that software of the second electronic device 200 is not supported by the first electronic device 100, the first electronic device 100 may request an input to select an update mode using the FOTA or the USB.

The input may be requested in various manners. For example, the first electronic device 100 may display a window including input request information to request an input to select an update mode using the FOTA or the USB. A more detailed description thereof will be given below with reference to FIG. 10.

The first electronic device 100 may determine whether to perform update using the FOTA (S420). Upon receiving an input to request update using the FOTA, the first electronic device 100 may determine update to be executed using the FOTA. Upon receiving no input to request update using the FOTA, the first electronic device 100 may determine update not to be executed using the FOTA.

Upon determining update to be executed using the FOTA, the first electronic device 100 may determine whether the first electronic device 100 or the second electronic device 200 is connected to the Internet (S430).

The first electronic device 100 may perform FOTA-based software update based on connection with the Internet (S440). When the first electronic device 100 is connected to the Internet, information for software update may be downloaded into the second electronic device 200 through the first electronic device 100, whereby software update may be performed. When the second electronic device 200 is connected to the Internet, the first electronic device 100 may update software based on transmission of a software update request to the second electronic device 200. The FOTA-based software update is known to those skilled in the art, and therefore a detailed description thereof will be omitted.

Upon determining that update using the FOTA is not executed, the first electronic device 100 may check whether the USB is connected (S450). Here, the USB may be connected to the first electronic device 100 or the second electronic device 200, and a program for software update may be stored in the USB.

The first electronic device 100 may execute the program for software update stored in the USB to perform software update of the second electronic device 200 based on the USB connection (S460).

Depending on circumstances, the first electronic device 100 may provide the second electronic device 200 with information indicating that software update is necessary before execution of step S410. Each operation of FIG. 6 may be performed by the second electronic device 200 based thereon.

FIG. 7 is a functional block diagram of a first electronic device and a second electronic device according to another embodiment of the present disclosure. Specifically, FIG. 7 shows the case in which, when a second electronic device is an autonomous driving module having a function related to autonomous driving, a first electronic device uses the autonomous driving function based on connection with the second electronic device.

Referring to FIG. 7, a system 3 may include a first electronic device 301 mounted in a vehicle and a second electronic device 302 including a program for provision of an autonomous driving function. The first electronic device 301 and the second electronic device 302 may be connected to each other through a first interface 330 and a second interface 340. Depending on circumstances, the second electronic device 302 may also be referred to as an autonomous driving module for autonomous driving.

The first electronic device 301 may include a first SoC 310 configured to control overall driving of the first electronic device 301 and a storage 320 configured to store information about driving of the first electronic device 301 and information about another device connectable to the first electronic device 301.

The second electronic device 302 may include a second SoC 350 configured to control overall driving of the second electronic device 302, a storage 390 configured to store information about driving of the second electronic device 302, an autonomous driving module information storage device 380 configured to store information about the second electronic device 302, and a hub 370 configured to connect another external electronic device or the second SoC 350 to the autonomous driving module information storage device 380.

In addition, the second electronic device 302 may include an external device configured to provide an autonomous driving function. For example, the second electronic device 302 may include a camera 361, radar 363, and lidar 365;

however, the present disclosure is not limited thereto. Various devices related to execution of the autonomous driving function may be included. Depending on circumstances, the external device may be implemented so as to be connected to the second electronic device 302; however, the present disclosure is not limited thereto.

Meanwhile, the radar 363 may be a sensor configured to emit electromagnetic waves and to analyze electromagnetic waves reflected by an object therearound, thereby measuring the distance from the object therearound. The lidar 365 may be a sensor configured to emit a laser and to analyze the laser reflected by an object therearound, thereby measuring the distance from the object therearound. The radar 363 and the lidar 365 are known to those skilled in the art, and therefore a detailed description thereof will be omitted.

The first SoC 310 may initialize the first interface 330 and the second interface 340 in response to start of booting. Initialization of the first interface 330 and the second interface 340 may be independently performed irrespective of order.

The first SoC 310 may check whether the autonomous driving module information storage device 380 is connected through the first interface 330. The first SoC 310 may check whether the autonomous driving module information storage device 380 is connected based on communication through the first interface 330.

Specifically, the first SoC 310 may attempt communication through the first interface 330. When a specific signal is transmitted through the first interface 330 by the attempt to perform communication, the hub 370 may recognize the same, and may connect the first interface 330 to the autonomous driving module information storage device 380. Upon the first SoC 310 receiving a response signal from the autonomous driving module information storage device 380, the first SoC 310 may determine that the autonomous driving module information storage device 380 is connected.

The attempt to perform communication through the first interface 330 may be made a specific number of times preset based on booting time of the first electronic device and recognition time of the autonomous driving module information storage device or less. The attempt to perform communication through the first interface 330 may be made within booting time of the first electronic device 301 and the second electronic device 302 based thereon.

When the autonomous driving module information storage device 380 is identified, the first SoC 310 may acquire information about the second electronic device 302 based on connection with the autonomous driving module information storage device 380. The information about the second electronic device 302 may include information about at least one of hardware and software of the second electronic device 302. The information about hardware may include type of hardware, version of hardware, manufacturing date of hardware, and performance of hardware. The information about software may include various kinds of information related to software, such as type of software, version of software, manufacturing date of software, and upgrade date of software.

When the autonomous driving module information storage device 380 is not identified or the information about the second electronic device 302 is not acquired, the first SoC 310 may attempt communication through the second interface 340. The attempt to perform communication through the second interface 340 may be made after booting of the first electronic device 301 and the second electronic device 302 is completed.

The first SoC 310 may be connected to the second SoC 350 through the second interface 340. Since the second SoC 350 takes charge of overall driving of the second electronic device 302, the second SoC may be internally connected to the autonomous driving module information storage device 380 through a specific path 355.

As shown, the second SoC 350 may be connected to the autonomous driving module information storage device 380 through the hub 370. Meanwhile, the hub 370 may include a switch, through which the hub may change a component connected to the autonomous driving module information storage device 380. For example, upon receiving a communication signal through the first interface, the hub 370 may move the switch to a first position such that the first SoC 310 is connected to the autonomous driving module information storage device 380 through the first interface. Upon receiving a specific signal by the second SoC 350, the hub may move the switch to a second position such that the second SoC 350 is connected to the autonomous driving module information storage device 380 through the specific path 355.

The first SoC 310 may transmit a signal for requesting autonomous driving module information (hereinafter referred to as an information request signal) to the second SoC 350 through the second interface 340. In response to the information request signal, the second SoC 350 may be connected to the autonomous driving module information storage device 380 to acquire information about the second electronic device 302 stored in the autonomous driving module information storage device 380. The second SoC 350 may transmit the information about the second electronic device 302 to the first SoC 310 through the second interface 340.

The first SoC 310 may check whether the acquired information about the second electronic device 302 corresponds to at least some of pre-stored information about an available device. When the acquired information about the second electronic device 302 corresponds to at least some of the pre-stored information about the available device, the first SoC 310 may determine that the second electronic device 302 is a device connectable to the first electronic device 301.

In this case, although the first electronic device 301 is a device that cannot provide an autonomous driving function in the first place, the first electronic device can use the autonomous driving function of the second electronic device 302, whereby it is possible to provide the autonomous driving function to a user of the first electronic device 301.

When the acquired information about the second electronic device 302 does not correspond to any of the pre-stored information about the available device, the first SoC 310 may determine that the second electronic device 302 is a device that is not connectable to the first electronic device 301. In this case, the first SoC 310 may provide information indicating that connection is impossible, or may provide information requesting update or device exchange through the output device of the first electronic device 301 or the second electronic device 302.

FIG. 8 is a flowchart showing a control method of the first electronic device according to the other embodiment of the present disclosure. Specifically, FIG. 8 is a flowchart showing a control method of the first electronic device 301 in the system 3 including the first electronic device 301 and the second electronic device 302 of FIG. 7.

Referring to FIG. 8, the first electronic device 301 may initialize the first interface 330 and the second interface 340 in response to start of booting (S510). The first electronic device 301 may identify the autonomous driving module information storage device 380 through the first interface 330 (S520).

When the autonomous driving module information storage device 380 is identified, the first electronic device 301 may acquire the information about the second electronic device 302 from the autonomous driving module information storage device 380. The information about the second electronic device 302 may include information about hardware or software of the second electronic device 302. Since the second electronic device 302 is a device for autonomous driving, software may be software for autonomous driving.

When the autonomous driving module information storage device 380 is not identified, the first electronic device 301 may recognize the second electronic device 302 through the second interface (S530). When the second electronic device 302 is recognized, the first electronic device 301 may acquire the information about the second electronic device 302 from the second electronic device 302 (S560). The first electronic device 301 may compare the information about the second electronic device 302 with the information about the available device for the first electronic device 301 to check whether the second electronic device 302 is a device connectable to the first electronic device 301.

Upon checking that the second electronic device 302 is a connectable device, the first electronic device 301 may provide a function provided by the second electronic device 302, i.e. an autonomous driving function, based on connection with the second electronic device 302.

When the second electronic device 302 is not recognized, the first electronic device 301 may perform general driving (S540). General driving may be a function naturally provided by the first electronic device 301.

According to the embodiment of the present disclosure, as described above, the first electronic device 301 allows the second electronic device 302 to be connected to the first electronic device 301, whereby it is possible to provide a function based on the second electronic device 302, which is not provided by the first electronic device 301, to a user.

In order to use new functions as the result of growth of electronic technology, therefore, it is sufficient for the user to connect an external device configured to provide new technology, such as the second electronic device 302, to the first electronic device 301 without replacement of the first electronic device 301.

FIG. 9 shows an example of a user interface provided by the first electronic device according to the embodiment of the present disclosure. Specifically, FIG. 9 shows an example of information provided when it is not possible to use hardware of the second electronic device.

The first electronic device may include an output device, such as a display. In this case, information checked through the first electronic device related to the second electronic device may be displayed through the output device, as shown in FIG. 9.

Referring to FIG. 9, when hardware of the second electronic device cannot be used by the first electronic device, a window including text "unsupported device" may be displayed on the first electronic device.

Although not shown, the first electronic device may provide information about hardware of the second electronic device and information about hardware connectable to the first electronic device (e.g. type of hardware and version of hardware), in addition to the text shown in FIG. 9.

Depending on circumstances, the information of FIG. 9 may be displayed through the second electronic device; however, the present disclosure is not limited thereto.

FIG. 10 shows another example of the user interface provided by the first electronic device according to the embodiment of the present disclosure. Specifically, FIG. 10 shows an example of information provided when software of the second electronic device is unsupported (or unavailable).

Referring to FIG. 10, when software of the second electronic device cannot be used by the first electronic device, the first electronic device may provide information requesting software update, the current version of software of the second electronic device, and version of software connectable to the first electronic device. The above information may be displayed through the output device of the first electronic device.

As shown in FIG. 10, the first electronic device may display an input window 410 for update using the FOTA or update using the USB to request user input.

When an input for a region in which "FOTA update" is displayed is acquired, update using the FOTA may be performed by software of the second electronic device. When an input for a region in which "USB update" is displayed is acquired, update using the USB may be performed by software of the second electronic device.

Combinations of blocks of block diagrams and steps of the flowcharts appended to this specification may be performed by computer program instructions. Since the computer program instructions may be installed in a general-purpose computer, a special-purpose computer, or a processor of programmable data processing equipment, the instructions performed through the computer or the processor of the programmable data processing equipment generate a means configured to execute functions described in the blocks of the block diagrams or the steps of the flowcharts. Since the computer program instructions may be stored in a computer-usable or computer-readable memory for the computer or the processor of the programmable data processing equipment in order to implement functions in a specific manner, it is also possible to produce products including instruction means that execute functions described in the blocks of the block diagrams or the steps of the flowcharts using the instructions stored in the computer-usable or computer-readable memory. Since the computer program instructions may be loaded in the computer or the processor of the programmable data processing equipment, instructions for generating a process executed by the computer by performing a series of operation steps in the computer or the processor of the programmable data processing equipment in order to operate the computer or the processor of the programmable data processing equipment may also provide steps for executing the functions described in the blocks of the block diagrams or the steps of the flowcharts.

In addition, each block or each step may indicate a portion of a module, segment, or code including one or more executable instructions for performing specific logical function(s). In addition, it should be noted that, in some alternative embodiments, functions mentioned in the blocks or the steps may occur while deviating from the sequence. For example, two successively shown blocks or steps may be simultaneously performed, or the blocks or the steps may be performed in reverse order according to corresponding functions.

The above description merely illustrates the technical concept of the present disclosure, and it will be apparent to those skilled in the art that various modifications and alterations are possible without departing from intrinsic characteristics of the present disclosure. Therefore, the embodiments of the present disclosure do not define but describe the technical concept of the present disclosure, and the scope of the technical concept of the present disclosure is not limited by the embodiments. The scope of protection of the present disclosure should be determined by the appended claims, and all changes falling within the meaning and equivalency range of the appended claims are intended to be embraced therein.

What is claimed is:

1. An electronic device comprising:
a first interface configured to receive information about other electronic device stored in a device information storage device of the other electronic device;
a second interface configured to communicate with a processor of the other electronic device; and
at least one processor, wherein
the at least one processor is configured to:
attempt to acquire the information about the other electronic device from the device information storage device through the first interface before booting of the electronic device is completed in response to a booting operation of the electronic device;
when the device information storage device is identified through the first interface, acquire the information about the other electronic device from the device information storage device through the first interface;
when the device information storage device is not identified through the first interface, check whether the other electronic device is identified through the second interface; and
when the other electronic device is identified through the second interface, acquire the information about the other electronic device through the second interface based on communication with the processor of the other electronic device,
wherein the information about the other electronic device comprises information about hardware of the other electronic device and information about software of the other electronic device,
wherein the at least one processor is further configured to:
when the information about the other electronic device corresponds to at least some of information about a device usable by the electronic device, determine that use of a specific function based on the other electronic device is possible; and
when the information about the other electronic device does not correspond to any of the information about the device usable by the electronic device, release connection with the other electronic device or provide information for requesting update of the software of the other electronic device, and
wherein the information about the device usable by the electronic device is pre-stored in the electronic device.

2. The electronic device according to claim 1, wherein the at least one processor provides the specific function using the other electronic device based on the information about the other electronic device.

3. The electronic device according to claim 1, wherein the at least one processor is further configured to perform a booting operation comprising initialization of the electronic device in parallel with acquisition of the information about the other electronic device or an attempt to acquire the information.

4. The electronic device according to claim 1, wherein the at least one processor is further configured to attempt to acquire the information about the other electronic device from the device information storage device through the first interface based on a number of attempts to acquire the information corresponding to completion of the booting operation of the electronic device.

5. The electronic device according to claim 1, wherein a data-transfer rate through the first interface is lower than a data-transfer rate through the second interface.

6. The electronic device according to claim 5, wherein
the first interface comprises an inter-integrated circuit (I2C) or a serial peripheral interface (SPI), and
the second interface comprises peripheral component interconnect express (PCIe).

7. The electronic device according to claim 1, wherein
the device information storage device comprises a non-volatile memory, the device information storage device being included in the other electronic device independent of a storage of the other electronic device, and
the storage stores information required in relation to driving of the other electronic device.

8. A control method of an electronic device, the method comprising:
attempting to acquire information about other electronic device from a device information storage device of the other electronic device through a first interface configured to receive information stored in the device information storage device of the other electronic device before booting of the electronic device is completed in response to a booting operation of the electronic device;
when a device information storage device is identified through the first interface, acquiring the information about the other electronic device from the device information storage device through the first interface;
when the device information storage device is not identified through the first interface, checking whether the other electronic device is identified through a second interface configured to communicate with a processor of the other electronic device;
when the other electronic device is identified through the second interface, acquiring the information about the other electronic device through the second interface based on communication with the processor of the other electronic device;
when the information about the other electronic device corresponds to at least some of information about a device usable by the electronic device, determining that use of a specific function based on the other electronic device is possible; and
when the information about the other electronic device does not correspond to any of the information about the device usable by the electronic device, releasing connection with the other electronic device or providing information for requesting update of software of the other electronic device,
wherein the information about the device usable by the electronic device is pre-stored in the electronic device.

9. The method according to claim 8, wherein the electronic device provides the specific function using the other electronic device based on the information about the other electronic device.

10. The method according to claim 8, further comprising performing a booting operation comprising initialization of the electronic device in parallel with acquisition of the information about the other electronic device or an attempt to acquire the information.

11. The method according to claim 8, wherein the attempting to acquire information comprises attempting to acquire the information about the other electronic device from the device information storage device through the first interface based on a number of attempts to acquire the information corresponding to completion of the booting operation of the electronic device.

12. The method according to claim 8, wherein a data-transfer rate through the first interface is lower than a data-transfer rate through the second interface.

13. The method according to claim 8, wherein the information about the other electronic device comprises information about hardware of the other electronic device and information about software of the other electronic device.

14. A system comprising:
a first electronic device;
a second electronic device;
a first interface configured to transmit information about the second electronic device from a device information storage device to the first electronic device; and
a second interface configured to allow a processor of the first electronic device and a processor of the second electronic device to communicate with each other therethrough, wherein
the second electronic device comprises the device information storage device comprising the information about the second electronic device, and
the first electronic device is configured to:
attempt to acquire the information about the second electronic device from the device information storage device through the first interface before booting of the first electronic device is completed in response to a booting operation of the first electronic device;
when the device information storage device is identified through the first interface, acquire the information about the second electronic device from the device information storage device through the first interface;
when the device information storage device is not identified through the first interface, check whether the second electronic device is identified through the second interface; and
when the second electronic device is identified through the second interface, acquire the information about the second electronic device through the second interface based on communication with the processor of the second electronic device,
wherein the information about the second electronic device comprises information about hardware of the second electronic device and information about software of the second electronic device,
wherein the first electronic device is further configured to:
when the information about the second electronic device corresponds to at least some of information about a device usable by the first electronic device, determine that use of a specific function based on the second electronic device is possible; and
when the information about the second electronic device does not correspond to any of the information about the device usable by the first electronic device, release connection with the second electronic device or provide information for requesting update of the software of the second electronic device, and
wherein the information about the device usable by the first electronic device is pre-stored in the first electronic device.

* * * * *